United States Patent
Lee et al.

(10) Patent No.: US 8,423,044 B2
(45) Date of Patent: Apr. 16, 2013

(54) METHOD FOR ALLOCATING PHYSICAL HYBRID AUTOMATIC REPEAT REQUEST INDICATOR CHANNEL

(75) Inventors: Jung Hoon Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 107 days.

(21) Appl. No.: 12/987,896

(22) Filed: Jan. 10, 2011

(65) Prior Publication Data

US 2011/0103334 A1    May 5, 2011

Related U.S. Application Data

(63) Continuation of application No. 12/767,616, filed on Apr. 26, 2010, now Pat. No. 7,881,222, which is a continuation of application No. 12/361,185, filed on Jan. 28, 2009, now Pat. No. 7,778,148.

(60) Provisional application No. 61/023,895, filed on Jan. 28, 2008.

(30) Foreign Application Priority Data

Dec. 8, 2008 (KR) .................. 10-2008-0124085

(51) Int. Cl.
*H04J 11/00* (2006.01)
*H04J 9/00* (2006.01)
*H04L 27/08* (2006.01)
*H04L 5/04* (2006.01)
*H04L 1/18* (2006.01)
*H04W 72/04* (2009.01)

(52) U.S. Cl.
USPC ........ 455/456.1; 455/522; 370/204; 370/210; 370/252; 370/328; 370/330

(58) Field of Classification Search .................. 714/748; 370/252, 204, 210, 328, 330, 336, 342; 374/345; 455/456.1, 522
See application file for complete search history.

(56) References Cited

U.S. PATENT DOCUMENTS 6,977,888 B1    12/2005    Frenger et al.
7,281,189 B2    10/2007    Sudo
(Continued)

FOREIGN PATENT DOCUMENTS

CA    2697010 A1    2/2009
JP    2004-343258 A    12/2004
(Continued)

OTHER PUBLICATIONS

LG Electronics, "DL PHICH structure," 3GPP TSG RAN WG1 #50bis, R1-074199, Shanghai, China, Oct. 8-12, 2007, pp. 1-3.

(Continued)

*Primary Examiner* — William D Cumming
(74) *Attorney, Agent, or Firm* — Birch, Stewart, Kolasch & Birch, LLP

(57) ABSTRACT

A method for allocating a physical hybrid ARQ indicator channel (PHICH) is discussed. The method includes allocating a CDM group according to a cyclic prefix type in consideration of a ratio of the numbers of necessary CDM groups according to spreading factors, and allocating a PHICH to the allocated CDM group. The PHICH includes an ACK/NACK signal multiplexed by code division multiplexing (CDM). Therefore, resources for PHICH transmission are efficiently allocated and a transmission structure can be maintained irrespective of a spreading factor.

9 Claims, 10 Drawing Sheets

U.S. PATENT DOCUMENTS

| | | | |
|---|---|---|---|
| 7,586,866 | B2 | 9/2009 | Miyoshi |
| 7,778,148 | B2 * | 8/2010 | Lee et al. ............... 370/204 |
| 7,881,222 | B2 * | 2/2011 | Lee et al. ............... 370/252 |
| 2004/0042386 | A1 | 3/2004 | Uesugi et al. |
| 2004/0110473 | A1 | 6/2004 | Rudolf et al. |
| 2005/0229073 | A1 | 10/2005 | Sudo |
| 2005/0238053 | A1 | 10/2005 | Iochi et al. |
| 2006/0067207 | A1 | 3/2006 | Miyoshi |
| 2006/0198342 | A1 | 9/2006 | Uesugi |
| 2007/0201569 | A1 | 8/2007 | Pajukoski et al. |
| 2007/0263529 | A1 | 11/2007 | Ishikura et al. |
| 2008/0170634 | A1 | 7/2008 | Kwak et al. |
| 2008/0212464 | A1 * | 9/2008 | Kim et al. ............... 370/210 |
| 2009/0055703 | A1 * | 2/2009 | Kim et al. ............... 714/748 |
| 2009/0201904 | A1 * | 8/2009 | Lee et al. ............... 370/342 |
| 2009/0290538 | A1 * | 11/2009 | Kim et al. ............... 370/328 |
| 2009/0290568 | A1 | 11/2009 | Miyoshi |
| 2010/0202318 | A1 * | 8/2010 | Lee et al. ............... 370/252 |
| 2010/0260154 | A1 * | 10/2010 | Frank et al. ............... 370/336 |
| 2010/0273506 | A1 * | 10/2010 | Stern-Berkowitz et al. ............... 455/456.1 |
| 2010/0309808 | A1 | 12/2010 | Miki et al. |
| 2010/0322100 | A1 * | 12/2010 | Wan et al. ............... 370/252 |
| 2010/0323745 | A1 * | 12/2010 | Chen et al. ............... 455/522 |
| 2011/0044188 | A1 * | 2/2011 | Luo et al. ............... 370/252 |
| 2011/0051681 | A1 * | 3/2011 | Ahn et al. ............... 370/330 |

FOREIGN PATENT DOCUMENTS

| | | |
|---|---|---|
| JP | 2009-164976 A | 7/2009 |
| JP | 2010-537546 A | 12/2010 |
| KR | 2001-0081204 A | 8/2001 |
| KR | 2004-0099055 A | 11/2004 |
| KR | 10-2006-0016723 A | 2/2006 |
| KR | 10-2007-0080191 A | 8/2007 |
| KR | 2008-0065853 A | 7/2008 |
| KR | 10-2009-0019662 A | 2/2009 |
| TW | I262730 B | 9/2006 |
| WO | WO 2005/125140 A1 | 12/2005 |
| WO | WO 2009/096681 A1 | 8/2009 |

OTHER PUBLICATIONS

LG Electronics, "Downlink PHICH structure in extended cyclic prefix subframe," 3GPP TSG RAN WG1 #51, R1-074732, Jeju, Korea, Nov. 5-9, 2007, pp. 1-4.

LG Electronics, "PHICH to transmit antenna mapping in case of extended CP," 3GPP TSG RAN WG1 #51bis, R1-080259, Sevilla, Spain, Jan. 14-18, 2008, pp. 1-3.

Motorola, "PHICH Channel Structure," 3GPP TSG RAN1 #51, R1-074580, Jeju, Korea, Nov. 5-9, 2007, 2 pages.

KDDI; "Views on Remaining Issues for PHICH Structure Using Hybrid FDM/CDM Multiplexing in E-UTRA Downlink"; 3GPPTSG RAN WG1 Meeting #51bis; R1-080221 (Original R1-073784); Agenda Item 6.1.3; Sevilla, Spain; Jan. 14-18, 2008; pp. 1-3.

NEC Group; "Issue of Dynamic CP Length Change in a Cell with Mixed Unicast and MBMS Transmission"; RAN WG1 Meeting #47bis; R1-070357; Agenda Item 6.2; Sorrento, Italia; Jan. 15-19, 2007; pp. 1-7.

Nortel et al.; "Way Forward on Transmit Diversity for PHICH Channel"; 3GPP TSG-RAN WG1 #50bis; R1-074508; Agenda Item 6.2.3; Shanghai, China; Oct. 8-12, 2007; pp. 1-3.

Qualcomm Europe; "PHICH Resource Allocation"; 3GPP TSG-RAN WG1 #51bis; R1-080473; Agenda Item 6.1.3; Sevilla, Spain; Jan. 14-18, 2008; pp. 1-3.

Samsung; "PHICH Mapping in the Time Domain"; TSG-RAN WG1 #51bis; R1-080551; Sevilla, Spain; Jan. 14-18, 2008; pp. 1-7.

\* cited by examiner

Fig. 2A frequency →

| Antenna1 | $f_1(a)$ | $f_2(b)$ | | | $f_1(e)$ | $f_2(f)$ | | |
|---|---|---|---|---|---|---|---|---|
| Antenna2 | | | $f_1(c)$ | $f_2(d)$ | | | $f_1(g)$ | $f_2(h)$ |
| Antenna3 | $f_3(b)$ | $f_4(a)$ | | | $f_3(f)$ | $f_4(e)$ | | |
| Antenna4 | | | $f_3(d)$ | $f_4(c)$ | | | $f_3(h)$ | $f_4(g)$ |

....

Fig. 2B frequency →

| Antenna1 | $f_1(a_1+b_1+c_1+d_1)$ | $f_2(a_2+b_2+c_2+d_2)$ | | |
|---|---|---|---|---|
| Antenna2 | | | $f_1(a_3+b_3+c_3+d_3)$ | $f_2(a_4+b_4+c_4+d_4)$ |
| Antenna3 | $f_3(a_2+b_2+c_2+d_2)$ | $f_4(a_1+b_1+c_1+d_1)$ | | |
| Antenna4 | | | $f_3(a_4+b_4+c_4+d_4)$ | $f_4(a_3+b_3+c_3+d_3)$ |

| | | | |
|---|---|---|---|
| $f_1(a_1+b_1+c_1+d_1)$ | $f_2(a_2+b_2+c_2+d_2)$ | $f_1(a_3+b_3+c_3+d_3)$ | $f_2(a_4+b_4+c_4+d_4)$ |
| | | | |
| $f_3(a_2+b_2+c_2+d_2)$ | $f_4(a_1+b_1+c_1+d_1)$ | $f_3(a_4+b_4+c_4+d_4)$ | $f_4(a_3+b_3+c_3+d_3)$ |
| | | | |

Antenna1, Antenna2, Antenna3, Antenna4 frequency →

⋮

| | | | |
|---|---|---|---|
| $f_1(a_1+b_1+c_1+d_1)$ | $f_2(a_2+b_2+c_2+d_2)$ | $f_1(a_3+b_3+c_3+d_3)$ | $f_2(a_4+b_4+c_4+d_4)$ |
| | | | |
| $f_3(a_2+b_2+c_2+d_2)$ | $f_4(a_1+b_1+c_1+d_1)$ | $f_3(a_4+b_4+c_4+d_4)$ | $f_4(a_3+b_3+c_3+d_3)$ |

⋮

Fig. 5a frequency →

| Antenna1 | $f_1(a_1+b_1+c_1+d_1)$ | $f_2(a_2+b_2+c_2+d_2)$ | $f_1(a_3+b_3+c_3+d_3)$ | $f_2(a_4+b_4+c_4+d_4)$ |
|---|---|---|---|---|
| Antenna2 | $f_3(a_2+b_2+c_2+d_2)$ | $f_4(a_1+b_1+c_1+d_1)$ | $f_3(a_4+b_4+c_4+d_4)$ | $f_4(a_3+b_3+c_3+d_3)$ |

Fig. 5b frequency →

| Antenna1 | $f_1(a_1+b_1)$ | $f_2(a_2+b_2)$ | $f_1(c_1+d_1)$ | $f_1(c_2+d_2)$ |
|---|---|---|---|---|
| Antenna2 | $f_3(a_2+b_2)$ | $f_4(a_1+b_1)$ | $f_3(c_2+d_2)$ | $f_4(c_1+d_1)$ |

METHOD FOR ALLOCATING PHYSICAL HYBRID AUTOMATIC REPEAT REQUEST INDICATOR CHANNEL

CROSS-REFERENCE TO RELATED APPLICATIONS

This application is a continuation of U.S. application Ser. No. 12/767,616, filed on Apr. 26, 2010 now U.S. Pat. No. 7,881,222, which is a continuation of U.S. application Ser. No. 12/361,185, filed on Jan. 28, 2009 now U.S. Pat. No. 7,778,148, which claims the benefit of priority to Korean Patent Application No. 10-2008-0124085, filed on Dec. 8, 2008, and U.S. Provisional Application Ser. No. 61/023,895, filed on Jan. 28, 2008, all of which are hereby incorporated by reference as if fully set forth herein.

BACKGROUND OF THE INVENTION

1. Field of the Invention

The present invention relates to a resource allocation and indexing method for orthogonal frequency division multiplexing (OFDM) symbol regions and frequency of a signal transmitted on downlink in a cellular OFDM wireless packet communication system.

2. Discussion of the Related Art

When transmitting/receiving a packet in a mobile communication system, a receiver should inform a transmitter as to whether or not the packet has been successfully received. If the packet is successfully received, the receiver transmits an acknowledgement (ACK) signal to cause the transmitter to transmit a new packet. If the reception of the packet fails, the receiver transmits a negative acknowledgement (NACK) signal to cause the transmitter to re-transmit the packet. Such a process is called automatic repeat request (ARQ). Meanwhile, hybrid ARQ (HARQ), which is a combination of the ARQ operation and a channel coding scheme, has been proposed. HARQ lowers an error rate by combining a re-transmitted packet with a previously received packet and improves overall system efficiency.

In order to increase throughput of a system, HARQ demands a rapid ACK/NACK response from the receiver compared with a conventional ARQ operation. Therefore, the ACK/NACK response in HARQ is transmitted by a physical channel signaling method. The HARQ scheme may be broadly classified into chase combining (CC) and incremental redundancy (IR). The CC method serves to re-transmit a packet using the same modulation method and the same coding rate as those used when transmitting a previous packet. The IR method serves to re-transmit a packet using a different modulation method and a different coding rate from those used when transmitting a previous packet. In this case, the receiver can raise system performance through coding diversity.

In a multi-carrier cellular mobile communication system, mobile stations belonging to one or a plurality of cells transmit an uplink data packet to a base station. That is, since a plurality of mobile stations within one sub-frame can transmit an uplink data packet, the base station must be able to transmit ACK/NACK signals to a plurality of mobile stations within one sub-frame. If the base station multiplexes a plurality of ACK/NACK signals transmitted to the mobile stations within one sub-frame using code division multiple access (CDMA) within a partial time-frequency region of a downlink transmission band of the multi-carrier system, ACK/NACK signals with respect to other mobile stations are discriminated by an orthogonal code or a quasi-orthogonal code multiplied through a time-frequency region. If quadrature phase shift keying (QPSK) transmission is performed, the ACK/NACK signals may be discriminated by different orthogonal phase components.

When transmitting the ACK/NACK signals using CDMA in the multiplexed form in order to transmit a plurality of ACK/NACK signals within one sub-frame, a downlink wireless channel response characteristic should not be greatly varied in a time-frequency region in which the ACK/NACK signals are transmitted to maintain orthogonality between the different multiplexed ACK/NACK signals. Then, a receiver can obtain satisfactory reception performance without applying a special receiving algorithm such as channel equalization. Accordingly, the CDMA multiplexing of the ACK/NACK signals should be performed within the time-frequency region in which a wireless channel response is not significantly varied. However, if the wireless channel quality of a specific mobile station is poor in the time-frequency region in which the ACK/NACK signals are transmitted, the ACK/NACK reception performance of the mobile station may also be greatly lowered. Accordingly, the ACK/NACK signals transmitted to any mobile station within one sub-frame may be repeatedly transmitted over separate time-frequency regions in a plurality of time-frequency axes, and the ACK/NACK signals may be multiplexed with ACK/NACK signals transmitted to other mobile stations by CDMA in each time-frequency region. Therefore, a receiving side can obtain a time-frequency diversity gain when receiving the ACK/NACK signals.

In downlink of an OFDM wireless packet communication system, transmit antenna diversity may be obtained using four transmit antennas. That is, two modulation signals transmitted through two neighbor subcarriers are transmitted through two antennas by applying space frequency block coding (SFBC), and two subcarrier pairs coded by SFBC are transmitted through two different antenna pairs by applying frequency switching transmit diversity (FSTD), thereby obtaining a diversity order of 4.

FIG. 1 illustrates an example of operation of a diversity scheme.

In FIG. 1, one block indicates one subcarrier transmitted through one antenna, and $f_1(x)$, $f_2(x)$, $f_3(x)$, and $f_4(x)$ denote any SFBC functions that are applied to simultaneously transmit two signals through two antennas and to maintain orthogonality between two signals at a receiving side. Examples of the SFBC functions are as follows.

$$f_1(x)=x,\ f_2(x)=x,\ f_3(x)=-x^*,\ f_4(x)=x^* \quad \text{[Equation 1]}$$

In Equation 1, * indicates a conjugate, namely, a conjugate complex number of a specific complex number.

In FIG. 1, 'a', 'b', 'c', and 'd' indicate modulation symbols modulated to different signals. By repetition of a structure in which SFBC and FSTD are applied within an arbitrary OFDM symbol transmitted in downlink as illustrated in FIG. 1, a receiving side can apply a simple reception algorithm repeating the same SFBC and FSTD demodulation. Pairs of the modulation symbols (a,b), (c,d), (e,f), and (g,h) are coded by SFBC. In actuality, subcarriers to which SFBC/FSTD is applied do not always need to be successive in the frequency domain. For example, a subcarrier in which a pilot signal is transmitted may exist between subcarriers to which SFBC/FSTD is applied. However, if two subcarriers constituting a pair, coded by SFBC, are adjacent to each other in the frequency domain, wireless channel environments of one antenna with respect to two subcarriers are similar. Accordingly, interference between the two signals when the receiving side performs SFBC demodulation can be minimized.

As described in the above example, when applying the SFBC/FSTD antenna diversity transmission scheme using four transmit antennas in units of four subcarriers, a system structure for obtaining a diversity order of 4 can be simply implemented.

Meanwhile, a plurality of signals can be transmitted by code division multiplexing (CDM) in a manner of spreading one signal in OFDM downlink to a plurality of subcarriers through a (quasi-) orthogonal code. For instance, when transmitting different signals 'a' and 'b', in order to spread the two signals at a spreading factor (SF) of 2 by CDM, the signals 'a' and 'b' are converted into signal sequences $(a \cdot c_{11}, a \cdot c_{21})$ and $(b \cdot c_{12}, b \cdot c_{22})$ using (quasi-) orthogonal codes $(c_{11}, c_{21})$ and $(c_{12}, c_{22})$ of two chip lengths, respectively. The spread signal sequences are added to two subcarriers and modulated as $(a \cdot c_{11} + b \cdot c_{12})$ and $(a \cdot c_{21}\ b \cdot c_{22})$. For convenience of description, a signal sequence spread at an SF=N will be denoted by $a_1, a_2, \ldots, a_N$.

To allow a receiving side to demodulate a signal spread through a plurality of subcarriers by despreading the signal, each chip of a received signal sequence should experience a similar wireless channel response. If four different signals 'a', 'b', 'c', and 'd' that are spread at an SF of 4 are transmitted through four subcarriers by an SFBC/FSTD scheme, received signals in the respective subcarriers are as follows.

Subcarrier 1: $h_1(a_1+b_1+c_1+d_1)-h_3(a_2+b_2+c_2+d_2)^*$

Subcarrier 2: $h_1(a_2+b_2+c_2+d_2)+h_3(a_1+b_1+c_1+d_1)^*$

Subcarrier 3: $h_2(a_3+b_3+c_3+d_3)+h_4(a_4+b_4+c_4+d_4)^*$

Subcarrier 4: $h_2(a_4+b_4+c_4+d_4)+h_4(a_3+b_3+c_3+d_3)^*$  [Equation 2]

In Equation 2, $h_i$ indicates fading of an i-th antenna. It is assumed that subcarriers of the same antenna experience the same fading and a noise component added at the receiving side is disregarded. It is also assumed that the number of receive antennas is one.

Spread sequences obtained at the receiving side after demodulation of SFBC and FSTD are as follows.

$(|h_1|^2+|h_3|^2) \cdot (a_1+b_1+c_1+d_1)$, $(|h_1|^2+|h_3|^2) \cdot (a_2+b_2+c_2+d_2)$, $(|h_2|^2+|h_4|^2) \cdot (a_3+b_3+c_3+d_3)$, $(|h_2|^2+|h_4|^2) \cdot (a_4+b_4+c_4+d_4)$  [Equation 3]

To separate the spread sequences obtained at the receiving side from signals 'b', 'c', and 'd' by despreading using a (quasi-) orthogonal code corresponding to a signal 'a', wireless channel responses to the four chips should be the same. However, as can be seen from the above example, signals transmitted by FSTD through different antenna pairs are $(|h_1|^2+|h_3|^2)$ and $(|h_2|^2+|h_4|^2)$ which are different wireless channel responses. Therefore, different signals multiplexed by CDM can not be removed completely during despreading.

SUMMARY OF THE INVENTION

An object of the present invention devised to solve the problem lies in providing a method for allocating a PHICH, which is capable of efficiently allocating resources for PHICH transmission and maintaining a transmission structure irrespective of an SF.

The object of the present invention can be achieved by providing a method for allocating a PHICH, including allocating a CDM group according to a cyclic prefix type and a spreading factor, and allocating a PHICH to the allocated CDM group. The PHICH includes an ACK/NACK signal multiplexed by CDM.

In allocating the CDM group, the CDM group may be allocated such that a value obtained by multiplying a spreading factor by the number of CDM groups is a constant value.

In allocating the CDM, the number of CDM groups may be determined to satisfy $G_M = G_N * (N/M)$ (where $G_N$ is the number of CDM groups when a spreading factor is N and $G_M$ is the number of CDM groups when a spreading factor is M) when two spreading factors are present.

In allocating the CDM, the number of CDM groups may be determined to satisfy $G_M = G_N * \text{ceil}(N/M)$ (where $G_N$ is the number of CDM groups when a spreading factor is N and $G_M$ is the number of CDM groups when a spreading factor is M) when two spreading factors are present.

In allocating the PHICH, a group index may be allocated first to an index of the ACK signal.

In allocating the PHICH, an ACK signal or a NACK signal may be mapped only to either an I channel or a Q channel. In this case, a CDM group index of each ACK/NACK signal may be determined by $g^{PHICH} = i^{PHICH} \mod N_g$ and a CDM code index for multiplexing within each group may be determined by $c^{PHICH,g} = (\text{floor}(i^{PHICH}/N_g))$ (where $N_g$ is the number of CDM groups for transmission of an ACK/NACK signal, and $i^{PHICH}$ is an index of an ACK/NACK signal).

In allocating the PHICH, an ACK or a NACK signal may be mapped to an I channel and a Q channel. In this case, a CDM group index of each ACK/NACK signal may be determined by $g^{PHICH} = i^{PHICH} \mod N_g$ and a CDM code index for multiplexing within each group may be determined by $c^{PHICH,g} = (\text{floor}(i^{PHICH}/N_g)) \mod SF$ (where $N_g$ is the number of CDM groups for transmission of an ACK/NACK signal, $i^{PHICH}$ is an index of an ACK/NACK signal, and SF is a spreading factor).

Preferably in the above methods, the CDM group may be a physical hybrid automatic repeat request indicator channel (PHICH) group.

According to the exemplary embodiments of the present invention, resources can be efficiently allocated for PHICH transmission and a transmission structure can be maintained irrespective of an SF.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 2 illustrates an example of four different signals spread by an SF of 4;

FIG. 3 illustrates an example of an antenna diversity method applied to the present invention;

FIGS. 5a and 5b illustrate an example of applying the method of FIG. 4 to the case where a spread sequence is transmitted through two transmit antennas by an SFBC scheme;

DETAILED DESCRIPTION OF THE INVENTION

Hereinafter, preferred embodiments of the present invention will be described in detail with reference to the annexed drawings. The detailed description, which will be given below with reference to the accompanying drawings, is intended to explain exemplary embodiments of the present invention, rather than to show the only embodiments that can be implemented according to the invention.

The exemplary embodiments of the present invention will now be described with reference to the accompanying drawings. The following embodiments of the present invention can be modified into different forms without loosing the spirit of the present invention, and it should be noted that the scope of the present invention is not limited to the following embodiments.

Hereinafter, a method is proposed for transmitting a spread sequence of signals multiplexed by CDM on N subcarriers with SF=N only through an antenna pair coded by SFBC in a system applying SFBC and/or FSTD scheme as 4-antenna transmit diversity.

FIG. 3 illustrates an example of an antenna diversity method applied to the present invention.

In FIG. 3, each of antenna pair (1, 3) and antenna pair (2, 4) is used for transmitting a signal by an SFBC scheme. An FSTD scheme is applied between the two antenna pairs. Assuming that transmission data is transmitted on one OFDM symbol, a signal spread at an SF of 4 (i.e., for the case of normal cyclic prefix) is transmitted through adjacent four subcarriers of one OFDM symbol through an antenna pair coded by SFBC. The same signal may be repeated on frequency axis to obtain diversity. In this case, as illustrated in FIG. 3, by changing the antenna pair for use of SFBC with the passage of time, an antenna diversity order of 4 can be obtained. In particular, an SF of a signal multiplexed by CDM on N subcarriers does not always need to be N and may be an arbitrary number M less than N.

Figure 1:
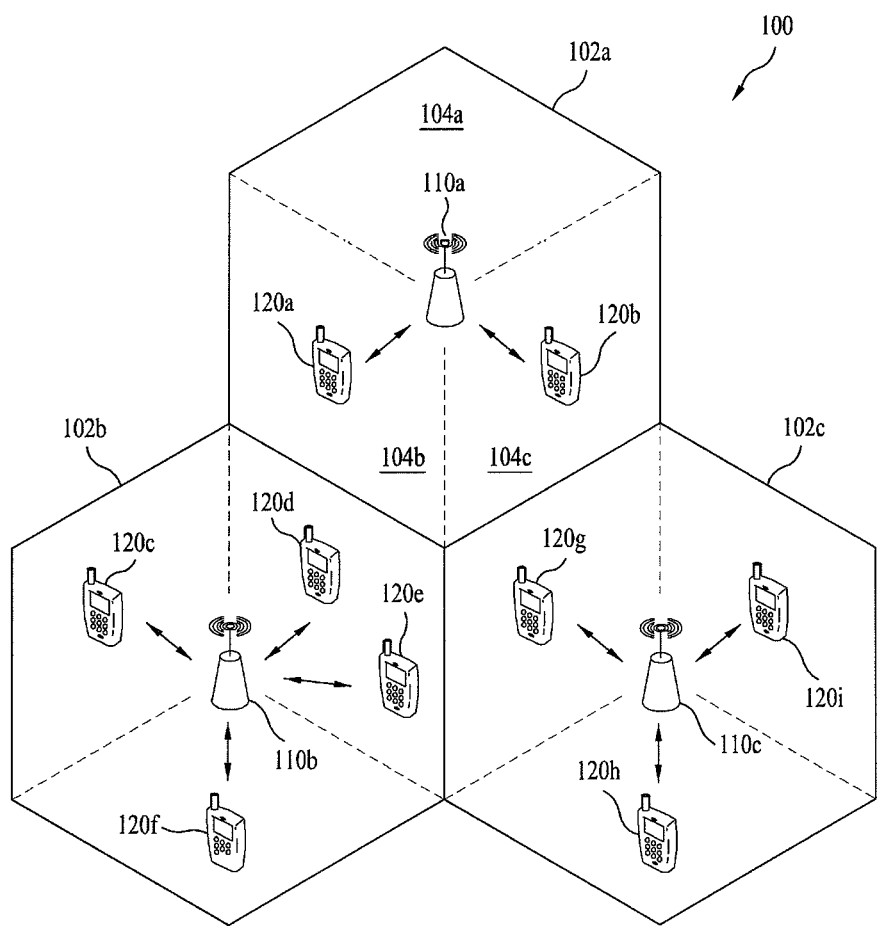
FIG. 1 illustrates an example of operation of a transmit diversity scheme.
Figure 4:
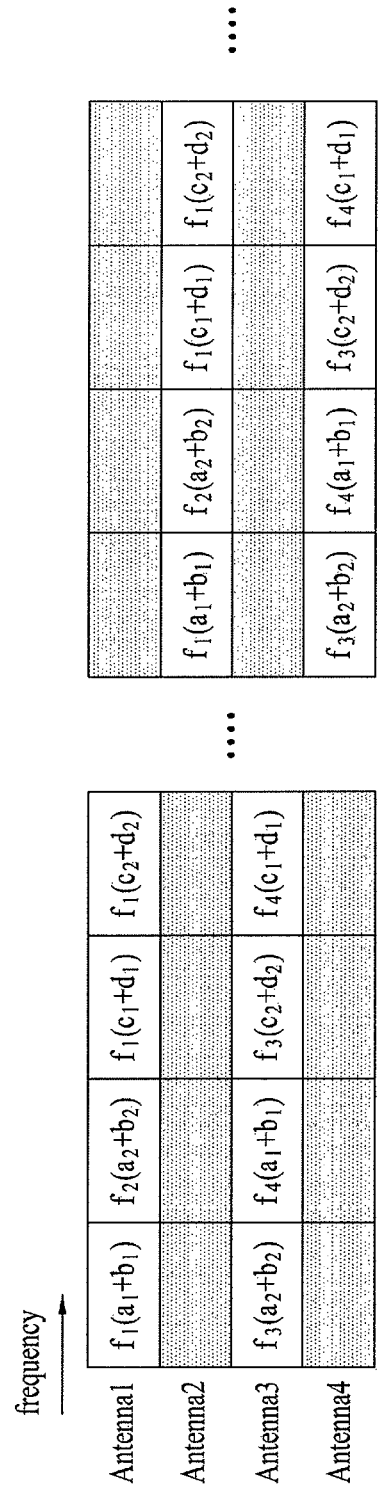
FIG. 4 illustrates an example of transmitting a spread sequence of a signal multiplexed by CDM on four subcarriers at an SF of 2 through two subcarriers.

FIG. 4 illustrates an example of transmitting a spread sequence of a signal multiplexed by CDM on four subcarriers at an SF of 2 (in an extended cyclic prefix) through two subcarriers.

An SFBC/FSTD transmission scheme is applied in units of four adjacent subcarriers as illustrated in FIG. 3. In FIG. 4, each of signals spread at an SF of 2 rather than at an SF of 4 and multiplexed by CDM is transmitted in units of two subcarriers. The method shown in FIG. 4 can be modified for an arbitrary M, N satisfying M<=N. Specifically, the method shown in FIG. 4 is applicable even when the spread sequence is transmitted by an SFBC scheme using two transmit antennas and when the spread sequence is transmitted using one transmit antenna.

FIGS. 5a and 5b illustrate an example of applying the method of FIG. 4 to the case where a transmission is performed by an SFBC scheme through two transmit antennas.

FIG. 5a illustrates a method for transmitting a spread sequence of a signal multiplexed by CDM at an SF of 4 on four subcarriers through four subcarriers. FIG. 5b illustrates a method for transmitting a spread sequence of a signal multiplexed by CDM at an SF of 2 on four subcarriers through two subcarriers. In FIG. 5b, the SFBC transmission scheme is applied in units of four neighbor subcarriers as in FIG. 5a. Data transmitted through subcarriers is spread at an SF of 2 rather than at an SF of 4 and signals multiplexed by CDM are transmitted in units of two subcarriers. Even if the number of transmit antennas is one, the above scheme is still applicable.

Figure 6A:
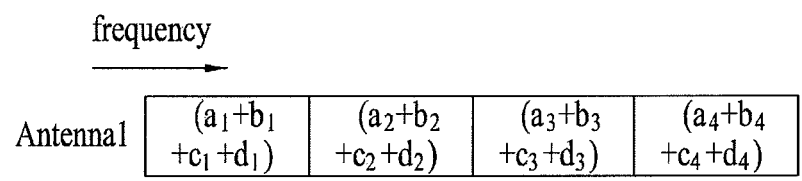
FIGS. 6a and 6b illustrate an example of transmitting a signal multiplexed by CDM using only one transmit antenna.
Figure 6B:
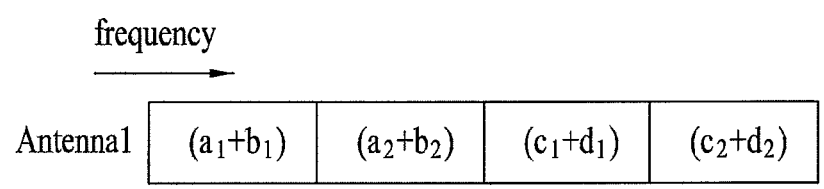

FIGS. 6a and 6b illustrate an example of transmitting a signal multiplexed by CDM using only one transmit antenna.

The basic methods shown in FIGS. 6a and 6b are the same as the methods shown in FIGS. 4, 5a and 5b. FIGS. 5a to 6b illustrate only the exemplary embodiments of the present invention. And, the methods according to FIGS. 5a to 6b can be modified for an arbitrary M, N satisfying M<=N. If the above methods are applied to a system which can selectively use one, two, or four transmit antennas, an arbitrary CDM signal or CDM signal groups may be allocated to a uniform structure in units of the same N number (especially, four) of subcarriers. For example, the above methods may be applied to a system using antennas of an arbitrary number in addition to the aforementioned number of antennas.

To indicate whether data transmitted in uplink has been successfully received, the above-described CDM multiplexing and mapping for obtaining transmit antenna diversity may be applied for an ACK/NACK signal transmitted in downlink. However, if multiple SFs of a signal multiplexed by CDM are present when using the above method for transmission of the ACK/NACK signal, resource allocation for a signal multiplexed by CDM may have a problem.

If one ACK/NACK signal is mapped to an I channel and a Q channel and then a symbol modulated to a complex value is spread at an SF of 4 and multiplexed by CDM, 8 ACK/NACK signals per CDM group can be transmitted. However, if the symbol is spread at an SF of 2, 4 ACK/NACK signals per CDM group are transmitted. Since the number of ACK/NACK signals which can be transmitted per CDM group differs according to an SF, the number of necessary CDM groups may be changed according to an SF when transmitting a constant number of ACK/NACK signals. For example, if 12 ACK/NACK signals should be transmitted, the number of CDM groups when an SF is 4 is 2 (=ceil (12/8)), whereas the number of CDM groups when an SF is 2 is 3 (=ceil (12/4)). Here, 'ceil' indicates a ceiling operation.

If the number of CDM groups differs according to the SF, it is difficult to apply a method using the same structure irrespective of the SF.

Figure 7A:
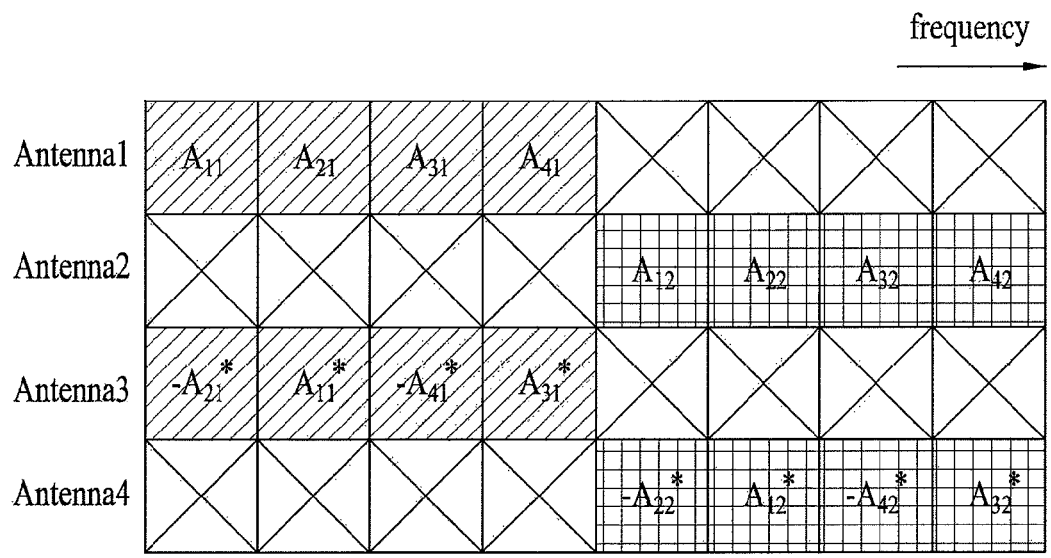
FIGS. 7a and 7b illustrate a problem generated when the number of necessary CDM groups differs according to an SF.
Figure 7B:
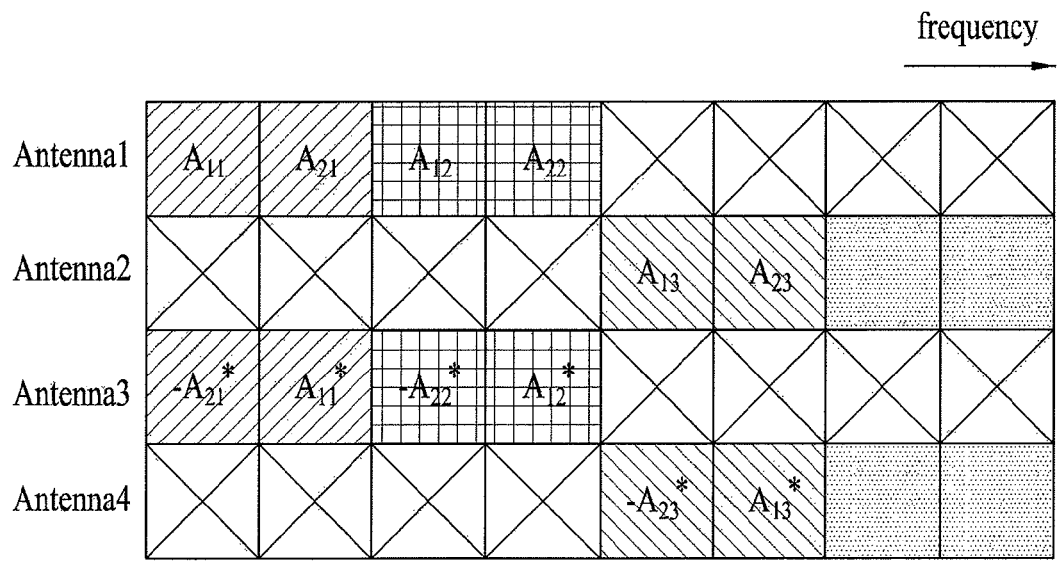

FIGS. 7a and 7b illustrate a problem occurring when the number of necessary CDM groups differs according to an SF.

In FIGS. 7a and 7b, each block denotes a resource element comprised of one OFDM symbol and one subcarrier. Further, $A_{ij}$ indicates an ACK/NACK signal multiplexed by CDM, i indicates an index of a multiplexed signal after spreading, and j indicates an index of a CDM group of the multiplexed ACK/NACK signal. As described above, at an SF of 4, two CDM groups are necessary to transmit 12 ACK/NACK signals, and at an SF of 2, three CDM groups are needed. If a transmission is performed with the same structure irrespective of an SF, resource elements to which signals are not allocated occur as illustrated in FIG. 7b where allocation is performed in units of four resource elements. In this case, resource elements which can be used to transmit signals are wasted and it is difficult to maintain the same transmission structure irrespective of the SF.

Figure 8:
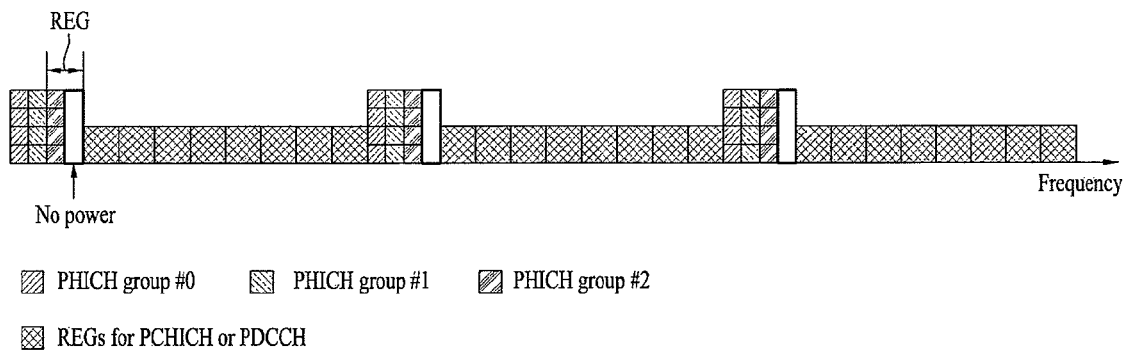
FIG. 8 illustrates an example of waste of resource elements when an SF is 2.

FIG. 8 illustrates an example of waste of resource elements when an SF is 2.

To solve such a problem when an SF varies, a method is proposed which can maintain the same structure regardless of variation of an SF by multiplying a variation rate of an SF by the number of CDM groups in case of a larger SF to determine the number of CDM groups. For example, when an SF is reduced to 2 from 4, if two CDM groups are needed at an SF of 4 to transmit 12 ACK/NACK signals, four CDM groups, which are obtained by multiplying the number (=2) of CDM groups when an SF is 4 by a variation (=2=SF4/SF2) in SFs, rather than three CDM groups (=ceil(12/4)), are allocated. When an SF is 4 and 2, the number of CDM groups for transmitting ACK/NACK signals necessary when an SF is 2 is twice the number of CDM groups when an SF is 4. Thus the problem in FIG. 7b can be solved.

Figure 9:
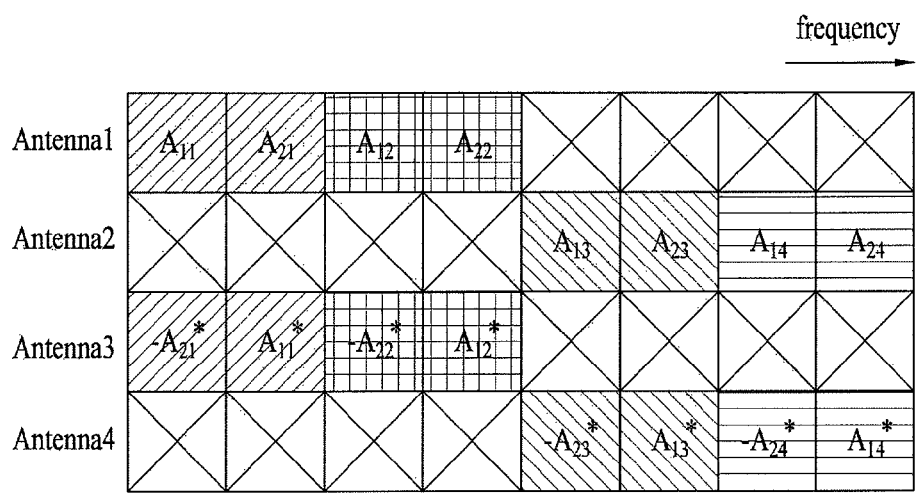
FIG. 9 illustrates an example of a channel allocation method according to an exemplary embodiment of the present invention.

FIG. 9 illustrates an example of a channel allocation method according to an exemplary embodiment of the present invention.

Unlike FIG. 7b, in FIG. 9, four CDM groups rather than three CDM groups are allocated. Accordingly, waste of resource elements is reduced and the same structure as FIG. 7a can be maintained. Hereinafter, it is assumed that two SFs are present. If the number of CDM groups when a larger SF is N is $G_N$ and the number of CDM groups when a smaller SF is M is $G_M$ (where N is larger than M), $G_M$ may be expressed by the following equation 4.

$$G_M = G_N * (N/M) \quad \text{[Equation 4]}$$

If N is not a multiple of M, $G_M$ can be obtained by replacing (N/M) with ceil(N/M). The aforementioned SF values are only examples for the detailed description of the present invention and therefore arbitrary values for N and M may be applied. Moreover, the SF values are not limited to the two cases and may be applied to more than two cases. The present invention is also applicable even when ACK/NACK signals are repeatedly transmitted.

Hereinafter, a method is proposed for allocating each ACK/NACK signals to each CDM group. To allocate ACK/NACK signals, a spread code index for CDM and a corresponding CDM group index should be allocated according to an index of each ACK/NACK signal. According to the proposed method, the CDM group index is first allocated as an index of each ACK/NACK signal is increased, and then the spread code index for CDM is increased when allocation of an entire group index is completed at a specific spread code index. ACK/NACK signals can be evenly allocated to each group by first allocating the group index. Furthermore, a problem generated when many ACK/NACK signals are allocated to a specific group, and thus much more interference occurs than in other cells, can be reduced. Namely, the proposed method is effective in applying the same structure regardless of an SF.

As an indexing method of an ACK/NACK signal, a method for mapping the ACK/NACK signal only to an I channel or only to a Q channel will now be described. A CDM group index $g^{PHICH}$ of each ACK/NACK signal and a CDM code index $c^{PHICH,g}$ for multiplexing within each group can be obtained by the following equation 5.

$$g^{PHICH} = i^{PHICH} \bmod N_g$$

$$c^{PHICH,g} = (\text{floor}(i^{PHICH}/N_g)) \quad \text{[Equation 5]}$$

where $N_g$ is the number of CDM groups for transmission of an ACK/NACK signal, and $i^{PHICH}$ is an index of an ACK/NACK signal.

The above method indicates an indexing method for the ACK/NACK signal when the ACK/NACK signal is mapped only to either the I channel or Q channel of a modulation symbol, namely, when one modulation symbol transmits one ACK/NACK signal.

As another indexing method of an ACK/NACK signal, a method for mapping the ACK/NACK signal both to the I channel and to the Q channel will now be described. A CDM group index $g^{PHICH}$ of each ACK/NACK signal and a CDM code index $c^{PHICH,g}$ for multiplexing within each group can be obtained by the following equation 6.

$$g^{PHICH} = i^{PHICH} \bmod N_g$$

$$c^{PHICH,g} = (\text{floor}(i^{PHICH}/N_g)) \bmod SF \quad \text{[Equation 6]}$$

where $N_g$ is the number of CDM groups for transmission of an ACK/NACK signal, $i^{PHICH}$ is an index of an ACK/NACK signal, and SF denotes a spreading factor.

Figure 10:
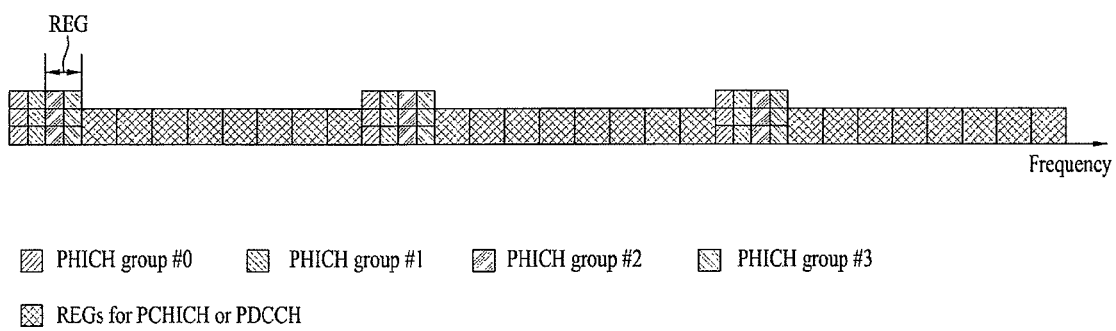
FIG. 10 illustrates an example of a channel mapping method according to another exemplary embodiment of the present invention.

Therefore, a channel mapping method according to another exemplary embodiment of the present invention uses the method of Equation 5 or Equation 6. FIG. 10 illustrates an example of applying the method of Equation 5 or Equation 6.

According to the above two methods, the CDM group index is first allocated while being increased as an index of the ACK/NACK signal is increased. In this case, the CDM code index is fixed. If allocation to the group index at the fixed CDM code index is completed, the CDM code index is increased and thereafter allocation to the group index is repeated.

If the ACK/NACK signals are mapped to the I channel and Q channel of a modulation simbol, that is, if two ACK/NACK signals are mapped to one modulation symbol, the signals may first be mapped to the I channel and thereafter may be mapped to the Q channel. If different ACK/NACK signals are mapped to the I channel and the Q channel, since performance degradation may be generated by interference between the I channel and the Q channel, such a case should be reduced. For example, a signal may first be mapped to the I channel. Alternatively, a signal may first be mapped to the Q channel.

A method for allocating indexes of ACK/NACK signals when the ACK/NACK signals are mapped to the I channel and the Q channel will now be described. When 12 ACK/NACK signals ($i^{PHICH}=0,1,2,\ldots,11$) are present and $N_g$ is 4 ($g^{PHICH}=0, 1, 2, 3$) at an SF of 2, the CDM group index $g^{PHICH}$, the CDM code index $c^{PHICH,g}$, I channel, and Q channel of each ACK/NACK signal may be allocated as shown in Table 1.

TABLE 1

| $i^{PHICH}$ | 0 | 1 | 2 | 3 | 4 | 5 | 6 | 7 | 8 | 9 | 10 | 11 |
|---|---|---|---|---|---|---|---|---|---|---|---|---|
| $g^{PHICH}$ | 0 | 1 | 2 | 3 | 0 | 1 | 2 | 3 | 0 | 1 | 2 | 3 |
| $c^{PHICH,g}$ | 0 | 0 | 0 | 0 | 1 | 1 | 1 | 1 | 0 | 0 | 0 | 0 |
| I or Q | I | I | I | I | I | I | I | I | Q | Q | Q | Q |

As can be seen from the increase in the group index $g^{PHICH}$ according to the index $i^{PHICH}$ of an ACK/NACK signal, it will be appreciated that the group index $g^{PHICH}$ is allocated first. Further, after allocation of the I channel is completed, the Q channel is allocated. If allocation is performed as shown in Table 1, the ACK/NACK signals can be evenly allocated to respective CDM groups and resources allocated for the ACK/NACK signals can be efficiently used. Moreover, a problem of interference between the I channel and the Q channel can be reduced. The above method is an example only and may be applied irrespective of the number of CDM groups, an SF, and the number of ACK/NACK signals.

Figure 11:
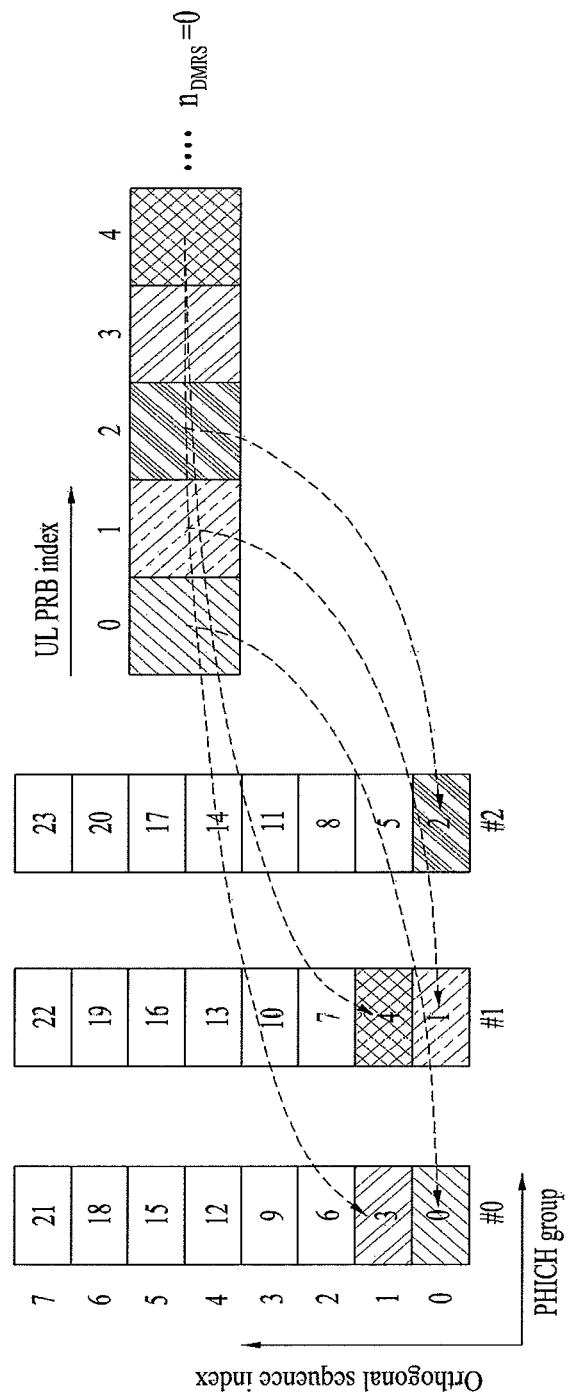
FIGS. 11 and 12 illustrate examples of a group index allocation method according to a further exemplary embodiment of the present invention.
Figure 12:
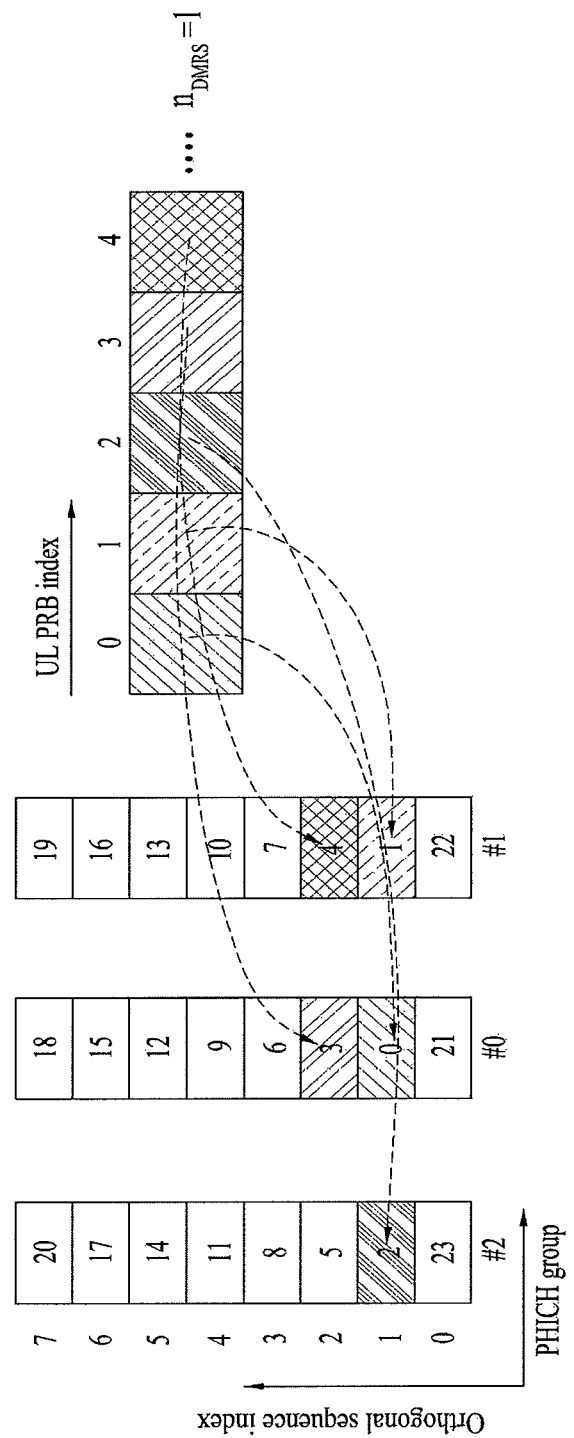

FIGS. 11 and 12 illustrate methods for allocating a group index according to a further exemplary embodiment of the present invention.

Without sequentially increasing the group index, allocation can be performed considering other parameters. For example, when considering a parameter $n_{DMRS}$, an allocation method may be changed. FIGS. 11 and 12 illustrate the cases where $n_{DMRS}$ is 0 and 1, respectively.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention provides a resource allocation and indexing method for frequency and OFDM symbol regions of a signal transmitted on downlink in a cellular OFDM wireless packet communication system and may be applied to a 3GPP LTE system, etc.

What is claimed is:

1. A method for receiving an acknowledgement/negative acknowledgement (ACK/NACK) signal in a wireless communication system, the method comprising:
    receiving, by a mobile station, two or more physical hybrid automatic repeat request indicator channel (PHICH) groups, each PHICH group of the two or more PHICH groups carrying one or more multiplexed acknowledgement/negative acknowledgement (ACK/NACK) signals;
    determining, by the mobile station, a PHICH group index for the ACK/NACK signal by using a first function; and
    determining, by the mobile station, a code index for the ACK/NACK signal by using a second function,
    wherein the first function and the second function include a common variable,
    wherein the first function has a property that makes the PHICH group index to be changed as the common variable increases by one, and
    wherein the second function has a property that changes the code index as the common variable increases by a number of the two or more PHICH groups.

2. The method of claim 1, wherein the common variable includes an index of one or more uplink physical resource block (PRB) indexes used for transmission of data block corresponding to the ACK/NACK signal.

3. The method of claim 1, wherein the first function and the second function further include a parameter related to a demodulation reference signal ($n_{DMRS}$), and the parameter is used as an offset in determining the PHICH group index and the code index.

4. The method of claim 1,
    wherein the first function includes: $i^{PHICH} \bmod N_g$, and
    wherein the $i^{PHICH}$ represents the common variable, $N_g$ represents the number of the two or more PHICH groups, and the mod represents a modulo operation.

5. The method of claim 1,
    wherein the second function includes: $\text{floor}(i^{PHICH}/N_g)$, and
    wherein the $i^{PHICH}$ represents the common variable, $N_g$ represents the number of the two or more PHICH groups, and the floor represents a floor function.

6. The method of claim 1, wherein code indexes are sequentially mapped to inphase (I) codes and then quadrature (Q) codes.

7. The method of claim 1, further comprising:
    reading, by the mobile station, one or more multiplexed ACK/NACK signals from a PHICH group of the two or more PHICH groups that is identified by the PHICH group index; and
    de-spreading, by the mobile station, the one or more read multiplexed ACK/NACK signals using an orthogonal code or a quasi-orthogonal code which is identified by the code index.

8. The method of claim 1, wherein the PHICH group index identifies a PHICH group allocated to the mobile station among the two or more PHICH groups.

9. The method of claim 1, wherein the code index identifies an orthogonal code or a quasi-orthogonal code used for multiplexing of the ACK/NACK signal.

* * * * *